E. A. HULTBERG.
METALLIC PROTECTOR FOR PNEUMATIC TIRES.
APPLICATION FILED JULY 17, 1908.
942,500. Patented Dec. 7, 1909.
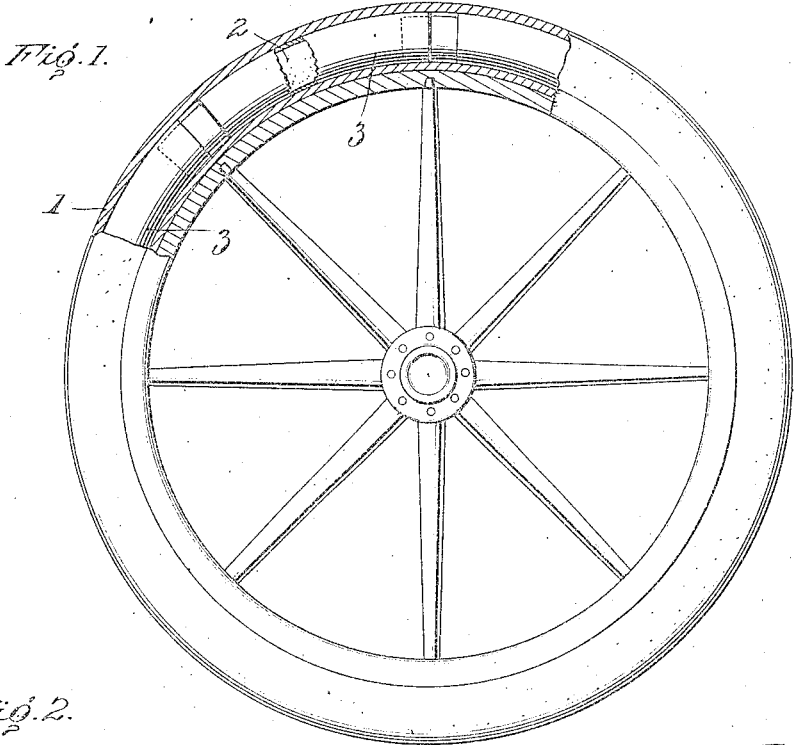
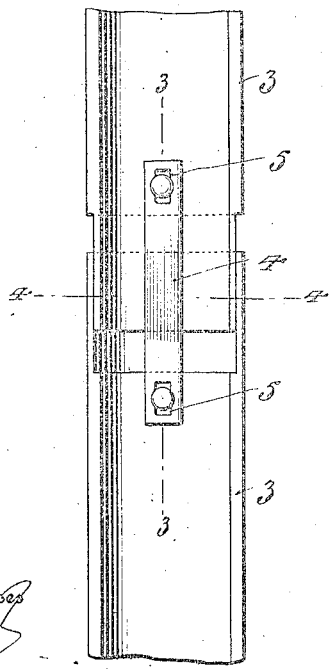
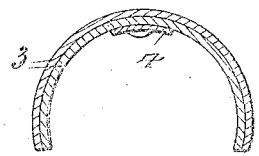
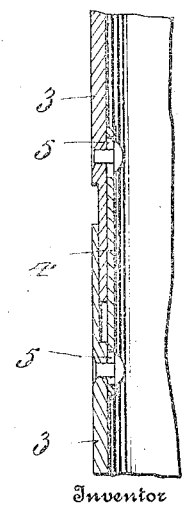
Inventor
Eric A. Hultberg

UNITED STATES PATENT OFFICE.

ERIC A. HULTBERG, OF CHICAGO, ILLINOIS.

METALLIC PROTECTOR FOR PNEUMATIC TIRES.

942,500.

Specification of Letters Patent.

Patented Dec. 7, 1909.

Application filed July 17, 1908. Serial No. 444,091.

*To all whom it may concern:*

Be it known that I, ERIC A. HULTBERG, a citizen of the United States, residing at Chicago, in the county of Cook and State of Illinois, have invented certain new and useful Improvements in Metallic Protectors for Pneumatic Tires, of which the following is a specification.

The present invention is intended to interpose a protector of novel structure between the inner tube and the casing or sheath of a pneumatic tire, said protector being formed of metal and comprising sections which overlap at the joints and are connected by means of springs in such a manner as to allow the sections to move relatively as the tread of the tire is depressed by the weight of the load reposed thereon.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a side view of a pneumatic tire embodying the invention, parts being broken away to show more clearly the relation of the elements. Fig. 2 is a bottom plan view of the joint formed between the ends of adjacent sections of the protector. Fig. 3 is a longitudinal section on the line 3—3 of Fig. 2. Fig. 4 is a transverse section on the line 4—4 of Fig. 2.

Corresponding and like parts are referred to in the following description and indicated in all the views of the drawings by the same reference characters.

The protector is adapted to be interposed between the casing or sheath 1 and inner tube 2 of a pneumatic tire, and comprises a series of sections 3 which are arranged with their ends overlapped at the joints. There may be any number of sections depending upon the diameter of the tire and the sections are formed of metal, such as steel, aluminum, brass or the like, and the curvature of the sections in transverse section will depend upon the diameter of the tire and the circumferential extent of each section may vary according to the amount or extent of the tire to be protected.

It is desirable that the protector cover the tread portion of the inner tube and extend along the sides thereof a sufficient distance to prevent injury from the lateral thrust of an object penetrating the side of the sheath or casing so as to prevent puncture of the inner tube. The overlapped ends of the section 3 are reduced in thickness about one-half so that a uniform thickness will exist at all points in the circumference of the protector.

A flat spring 4 is provided at each joint and extends beyond the overlapped end portions of adjacent sections and its ends are connected to the end portions of the sections beyond the overlapped portions. In order to allow the sections to move at the joints which is essential in order to allow the tread portion of the tire to yield, the end portions of the springs 4 are connected to the sections 3 in a manner to allow a limited play. This is effected by a slot 5 in each end portion of the several springs 4 and a headed stud 6 secured to the section 3 and operating in the slot 5, the head of the stud overlapping the portions of the spring bordering upon the slot 5. It will thus be understood that while the springs 4 preserve the joints and hold the sections in alinement, they, nevertheless, allow the sections to have a limited play so as not to detract from the yielding qualities of the tire which are essential to absorb shock and vibration.

Having thus described the invention, what is claimed as new is:

In a tire protector the combination with a tire of a plurality of metallic plates curved between their longitudinal edges to conform to the curvature of said tire, the extremities of said plates being oppositely reduced to allow the overlapping of the same and flat springs having longitudinal slots formed at the opposite ends thereof positioned against the inner faces of said plates, said flat springs being extended beneath the overlapped end of said plates and riveted loosely thereto.

In testimony whereof I affix my signature in presence of two witnesses.

ERIC A. HULTBERG. [L. S.]

Witnesses:
    D. O. KLUESSENDORF,
    R. H. NELSON.